Jan. 15, 1946.                M. WATTER                2,393,081
                            JOINT CONSTRUCTION
                         Filed June 28, 1943        10 Sheets-Sheet 1

INVENTOR
Michael Watter.
BY John P. Tarbox
ATTORNEY

FIG.5
(PRE-ASSEMBLY OF FIG.4.)

Patented Jan. 15, 1946

2,393,081

UNITED STATES PATENT OFFICE 2,393,081

JOINT CONSTRUCTION

Michael Watter, Philadelphia, Pa., assignor to Edward G. Budd Manufacturing Company, Philadelphia, Pa., a corporation of Pennsylvania Application June 28, 1943, Serial No. 492,493

23 Claims. (Cl. 244—124)

This invention relates to joint constructions, particularly to an improved joint for connecting a cantilever panel to supporting structure or connecting endwise adjacent parts of a cantilever panel, such as, for example, an aircraft wing or other airfoil.

In aircraft structures, for example, it is very desirable for manufacturing, shipping and repair purposes to make various parts in judicious subassemblies. This is particularly true in the case of large airfoils, such as wings, it being the practice in many cases to construct the wing of two parts, viz., an outer panel and an inner panel. In airfoils of the stressed-skin type, that is, a construction wherein a metal skin itself together with suitable reinforcing elements, carries a considerable portion of the load, a portion of the joint connection is made through each skin-and-reinforcement assembly to the adjacent wing or fuselage assembly. The skin and reinforcement assembly is often called the skin cover and sometimes the skin blanket. In such a construction it is desirable to distribute the transfer of the shear stresses and axial loads incident to cantilever loading, throughout a wide region at the root ends of the skin blankets but substantially in the planes of the blankets.

The primary aim of the present invention is the provision of a new and improved joint which is especially adaptable to cantilever loading, particularly over an extensive region.

Another object is to provide a load transfer joint of improved construction for cantilever panel members of the stressed metal skin type which is effective to efficiently distribute stresses at the root end thereof.

Another object is to provide a panel member with load transfer means at one end thereof for distribution of stresses at a plurality of regions and which embodies in addition means for transferring these stresses through improved shear connections to an adjacent member.

Another object is to provide a joint between adjacent panel members wherein a plurality of connections can be easily and quickly made and which in conjunction with closed panel members can be efficiently made from outside the panel members.

A further object is to provide a rigid joint of overlapping members in which the same is disposed along converging lines and the coupling members thereof are arranged stepwise or in echelon with access spaces therebetween.

The joint is so constructed that the tension and compression loads are transferred through the joint by shear in connecting bolts and the shear loads at the joint are taken by the coupling elements and the skin gap covers which are provided.

The advantages of the joint include accessibility and ease of assembly, ease of inspection, and greater structural efficiency.

With the above and other objects in view which will be obvious to those skilled in the art, the present invention consists in certain features of construction and combinations of parts to be hereinafter described with reference to the accompanying drawings, and then claimed.

The joint construction is shown, for the purpose of illustration, in connection with an aircraft wing of the type which includes skin covers or blankets embodying metallic skins and spanwise extending skin reinforcing stringers, the wing embodying an outer panel and an inner panel, each panel comprising a leading or nose section, a center or main section, and a trailing section, and the skin blankets being designed to carry the principal stresses near the front and rear edges of the center section and with much less stress carrying capacity at the middle of the center section. The nose section construction also provides considerable stress carrying capacity, while the trailing section is required and designed to carry very little stress. A stronger connection is made through the rear spar which is located at the rear of the center section and immediately in front of the trailing section.

The coupling members are designed for convenient anchorage or rooting with the skin stringers and for easy registry with each other when the wing panels are brought together. They provide holes for chordwise disposed connecting bolts which are stressed in shear, hence are very secure, very strong for their size, more reliable against fatigue and excessive bolt tightening, and do not warp the associated structure when tightened.

An embodiment of the invention is illustrated in the accompanying drawings, wherein.

GENERAL ARRANGEMENT

The present invention provides a strong joint between adjacent wing panels and is particularly applicable for connecting the outer wing panel with the center wing panel, sometimes referred to as the inner wing panel because it is located inboard of the outer wing panel; however, the invention is equally adaptable to the connection of a single wing panel with an adjacent fuselage section, or to other constructions wherein the load transfer by shear elements is involved. Such a joint is subjected to shearing stresses as well as tension and compression stresses because of the lateral forces imposed by the air upon the outer panel. The outer panel carries the aileron and this additionally imposes rotative torsional stresses in the joint. The joint provided hereby is well adapted to take the tension and compression stresses by reason of the fact that the connection is made between mating parts by bolts which are placed in shear rather than in tension and where consequently the stresses do not tend to strip the threads on the bolts. The wing panels are preferably joined on converging vertical planes, in effect a truncated V-shaped joint, rather than on a single straight vertical chordwise plane and this provides a strong spanwise cantilever reaction in the joint. However, the panels may be joined along a single transverse vertical plane. The connections along each of the converging planes are made through overlapping spanwise extending shear webs arranged stepwise or in echelon whereby each bolt hole is made accessible from the side along a line which is laterally spaced spanwise from the line of access for each adjacent hole. Before the wing panels are brought together the line of approach for each hole is clear of the end of the next lower shear web. Spaces are left between the shear webs of adjacent joint couples and this provides access for placing and securing the bolts of the joint. The connection for the particular wing construction illustrated herein is made especially strong at chordwise spaced locations with a correspondingly light intermediate construction, thus accommodating the heavy torsional stresses encountered and furnishing good resistance to the horizontal bending stresses due to forward flight.

The connection is made through the skin blankets, thus accommodating the maximum bending stresses and maintaining the stressed skin of adjacent panels in taut condition. The reinforcing elements of the skin blankets extend spanwise as stringers so the connection is made through these stringers and the metal skins. The stringers of the center wing panel are spaced further apart and in general are of larger size and heavier material than the stringers of the outer wing panel. Joint or coupling members are selected which match in integral units with the center wing panel stringers. The outer joint or coupling members, which must match the inner ones, in consequence do not match in integral units with the outer wing panel stringers. However, they do match in half units, specifically there being a 3 to 2 width relationship between stringers of the two panels, and their anchorage is correspondingly accommodated. This gives rise to several similar though specifically different anchorage or root constructions which will be particularly described. It is to be understood, however, that the stringers of the two panels may be of the same character, if desired.

The wing panels include a heavy trailing or rear spar, and the joint provides a good connection for the adjacent ends of this spar. At the portion of the wing under consideration the nose and forward portions of the wing serve as a front spar, and the joint provides a good connection for the adjacent ends of this spar-like construction. Behind the rear spar in the trailing section it is only necessary to provide a connective closure between the adjacent fabric-covered parts.

GENERAL ARRANGEMENT BY REFERENCE TO THE DRAWINGS

Figures 1, 2:
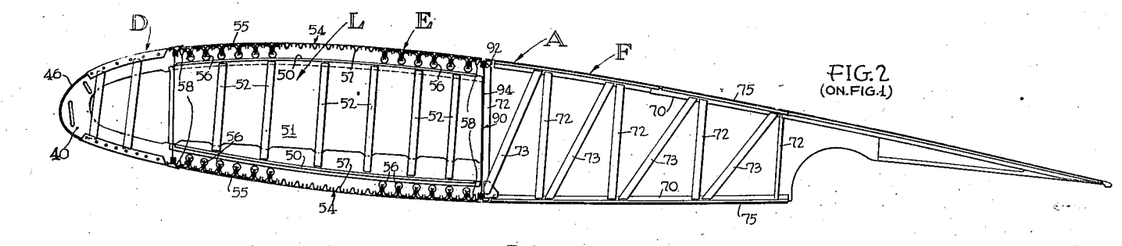
Fig. 1 is a plan view of the center and outer panels of an aircraft wing assembly embodying the invention.
Fig. 2 is an enlarged vertical chordwise section taken on the line 2—2 of Fig. 1.
Figures 1, 3:
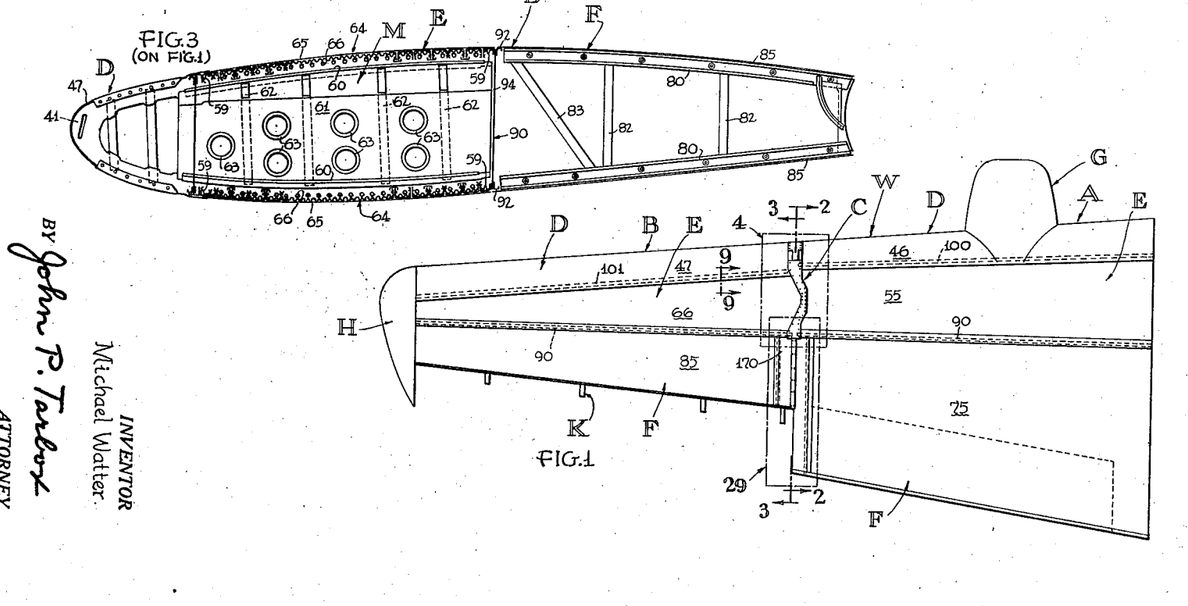
Fig. 3 is an enlarged vertical chordwise section taken on the line 3—3 of Fig. 1, the section being the same as section 2—2 but the view being taken in the opposite direction and inverted.

The general arrangement is shown by Figs. 1 to 3. The center section connection, where the major stresses are carried and where some of the main advantages of the invention are realized, is shown in Figs. 4 to 21, with a slight modification in Fig. 35. The leading or nose section connection is shown in Figs. 22 to 28. And the trailing section connection is shown in Figs. 30 to 34.

Referring to Fig. 1, the wing W here illustrated, in spanwise direction, comprises a center or inner wing panel A and an outer wing panel B, between which panels a joint C is established. It is this joint with which the present invention is concerned. In chordwise direction the wing comprises a leading or nose section D, a center or main load bearing section E, and an aft or trailing section F. The center panel carries a motor nacelle G; and the outer panel carries a tip H and an aileron (not shown) which is supported by hinge brackets K mounted on ribs (not shown). Both the center panel A and the outer panel B are provided with a number of chordwise extending ribs but only two are shown herein, these being illustrated in side elevation in Figs. 2 and 3 and referred to generally as the center panel rib L of Fig. 2 and the outer panel rib M of Fig. 3. It is to be noted that the rib M of Fig. 3 is shown in inverted position. It is also to be noted by reference to Figs. 6 and 23 that the nose rib here shown is not continuous with the center section rib element but is similar to the next nose rib which is connected to the center section rib element. Fig. 8 shows a through running rib construction.

Still referring to Figs. 2 and 3, the ribs L and M are in effect continuous throughout the chordwise width of the wing panels, including the nose section D, the center section E, and the trailing section F; but the principal or main stress-absorbing portion of the ribs is located in the center section; and this will be principally intended when reference is made to the ribs.

Nose section rib elements

The nose elements of ribs L and M (Figs. 2-3 and also Figs. 23 and 24) comprise contoured flanged nose plates 40 and 41 respectively reinforced by generally vertical struts 42 and by integral pressed ridges or wales 43. The rib plate 41 adjacent one side (Fig. 24) may be provided with an additional stiffening member 44. A nose skin sheet 46 is secured upon the nose plates 40 of the center panel A and a sheet 47 upon the nose plates 41 of the outer panel B.

Center section rib elements

The rib L in the center section of the center panel (Fig. 2) comprises chords 50 and webs 51 with vertical stiffening struts 52. Upon the chords 50 there are secured skin blankets 54 which include the skin sheets proper 55 and the skin stiffening stringers 56 and 57. The stringers 56 are located adjacent the leading and trailing edges of the skin blankets where the stresses are great, hence are of relatively heavy construction; whereas the stringers 57 are located in the center of the blankets where the stresses are relatively small hence are of lighter construction. This particular stringer arrangement is disclosed in detail in another application. Marginal stringers 58 of flanged channel or hat-shape are provided immediately adjacent and parallel with the edges of the blanket skin sheet.

Similarly the rib M in the center section of the outer wing panel (Fig. 3) comprises chords 60 and webs 61 with stiffening struts 62 and flanged stiffening apertures 63. Upon the chords 60 there are secured skin blankets 64 which include the skin sheets proper 65 and skin stiffening stringers 66. The stringers 66 of the outer wing panel are much smaller than the stringers 56 of the center wing panel and are not subject to such greatly varying stresses as are the stringers of the center wing panel, hence, as shown, the stringers 66 may be of uniform size from the leading edge to the trailing edge of the center section. In Fig. 3 there is an apparent difference between the stringers shown in the center from those shown at the edges but this is caused by the joint construction as will be explained hereinafter. Marginal stringers 59 of flanged channel or hat-shape are provided immediately adjacent and parallel with the edges of the blanket skin sheet.

Trailing section rib elements

The rib elements of the trailing section of the center wing panel (Fig. 2) comprise chords 70 and a connecting trusswork which includes the vertical struts 72 and the inclined struts 73. The skin sheets 75 here may be of canvas.

Similarly the rib elements of the trailing section of the outer wing panel (Fig. 3) comprise chords 80 and a connecting truss-work which includes the vertical struts 82 and one or more inclined struts 83. The skin sheets 85 here may be of canvas.

Spanwise spar elements

At the rear or trailing edge of the center sections of the center and outer wing panels (Figs. 1 to 3), where the greatest shear, torsional, and bending stresses are concentrated, there is provided a heavy rear spar 90 which includes cap strips 92 and the web 94. The spar is connected across the joint C, as will be explained.

At the front or leading edge of the center sections of the center and outer wing panels respectively, but specifically included in the rear structure of the nose sections, top and bottom (Fig. 1), there are provided strengthening beam-like stringers 100, 101 whose ends are slightly offset at the joint C, and means are provided for connecting these heavy stringers at the joint. The offset relation can be well seen in Fig. 6 and will be explained.

CENTER SECTION JOINT—FIGS. 4 TO 21

Figures 1, 4:
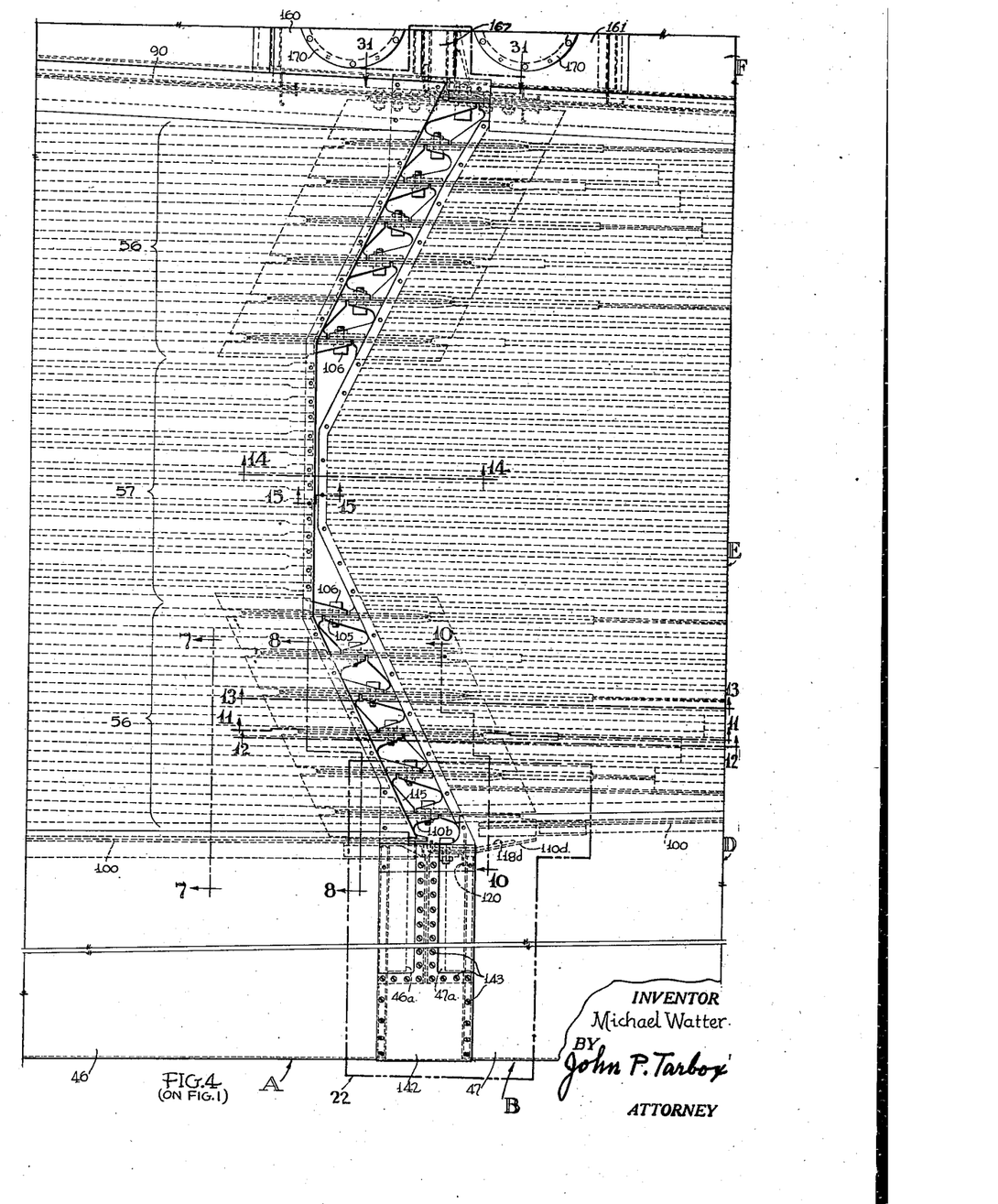
Fig. 4 is an enlarged top plan view taken about in the rectangular area 4 of Fig. 1 with the skin closure sheet removed and with certain parts shown in dotted lines.
Figures 1, 9:
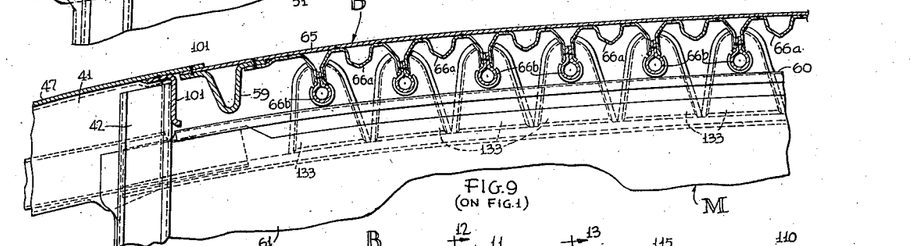
Fig. 9 is a partial enlarged vertical chordwise section taken on the line 9—9 of Fig. 1.
Figures 4, 5:
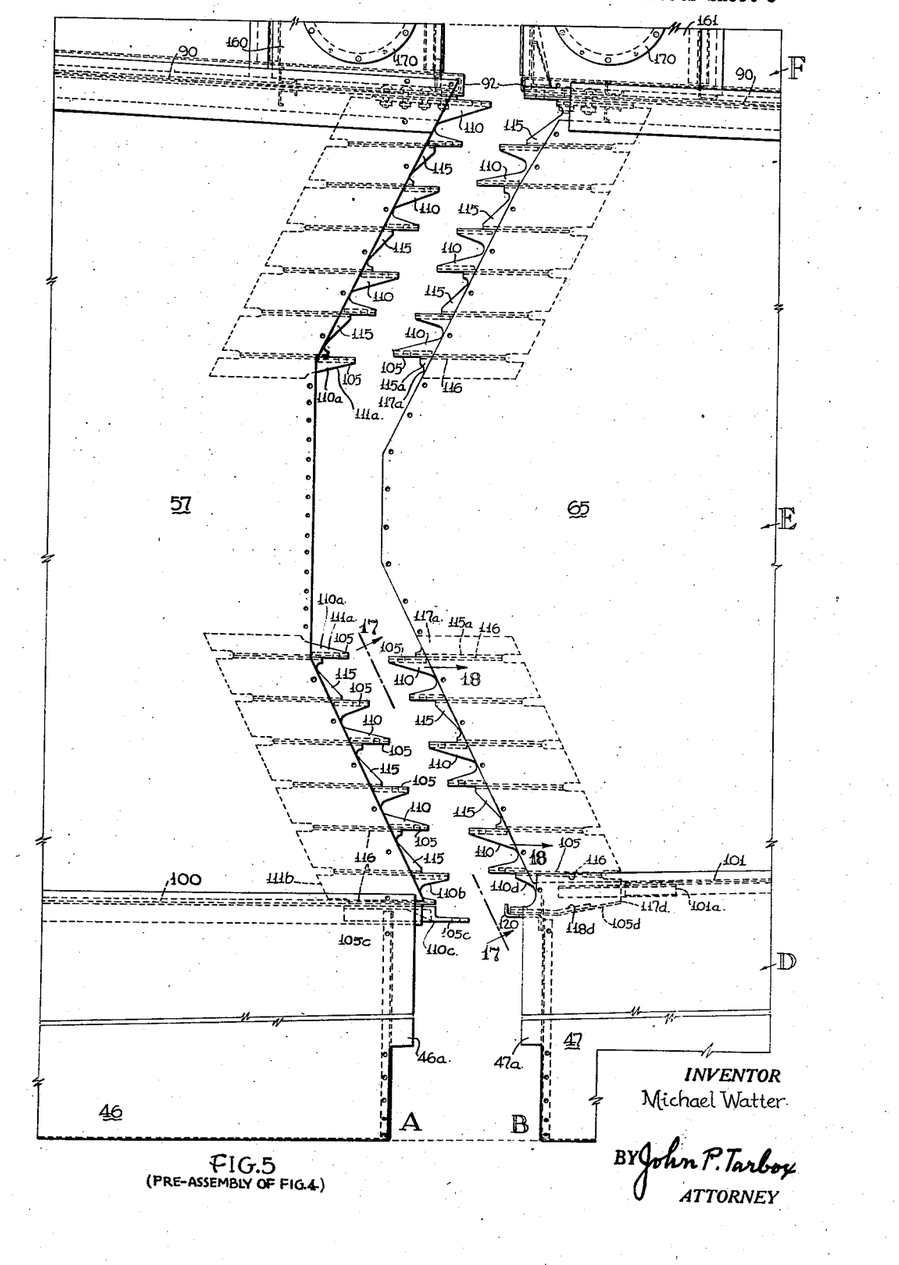
Fig. 5 is a view similar to Fig. 4 but showing the wing panels in the pre-assembly position and with less detail.
Figures 4, 7:
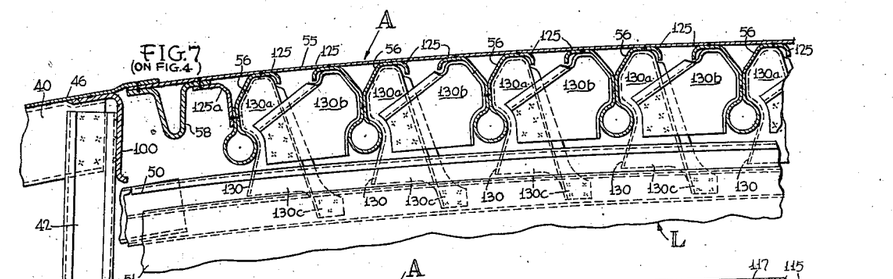
Fig. 7 is a partial enlarged vertical chordwise section taken on the line 7—7 of Fig. 4.
Figures 4, 8:
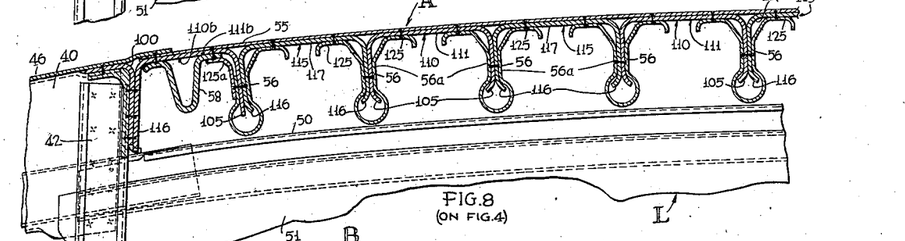
Fig. 8 is a partial enlarged vertical chordwise section taken on the line 8—8 of Fig. 4.
Figures 4, 10:
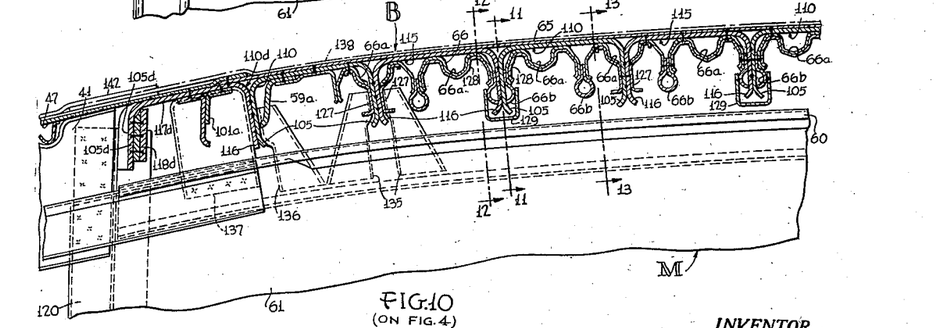
Fig. 10 is a partial enlarged vertical chordwise section taken on the line 10—10 of Fig. 4.
Figures 4, 11:
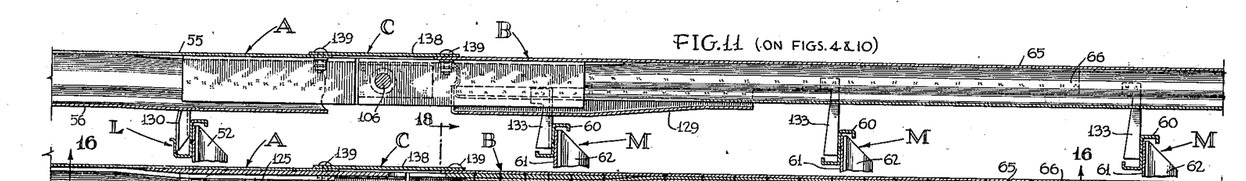
Fig. 11 is a partial enlarged vertical spanwise section taken on the line 11—11 of Figs. 4 and 10.
Figures 4, 6, 12, 13, 14, 15, 16:
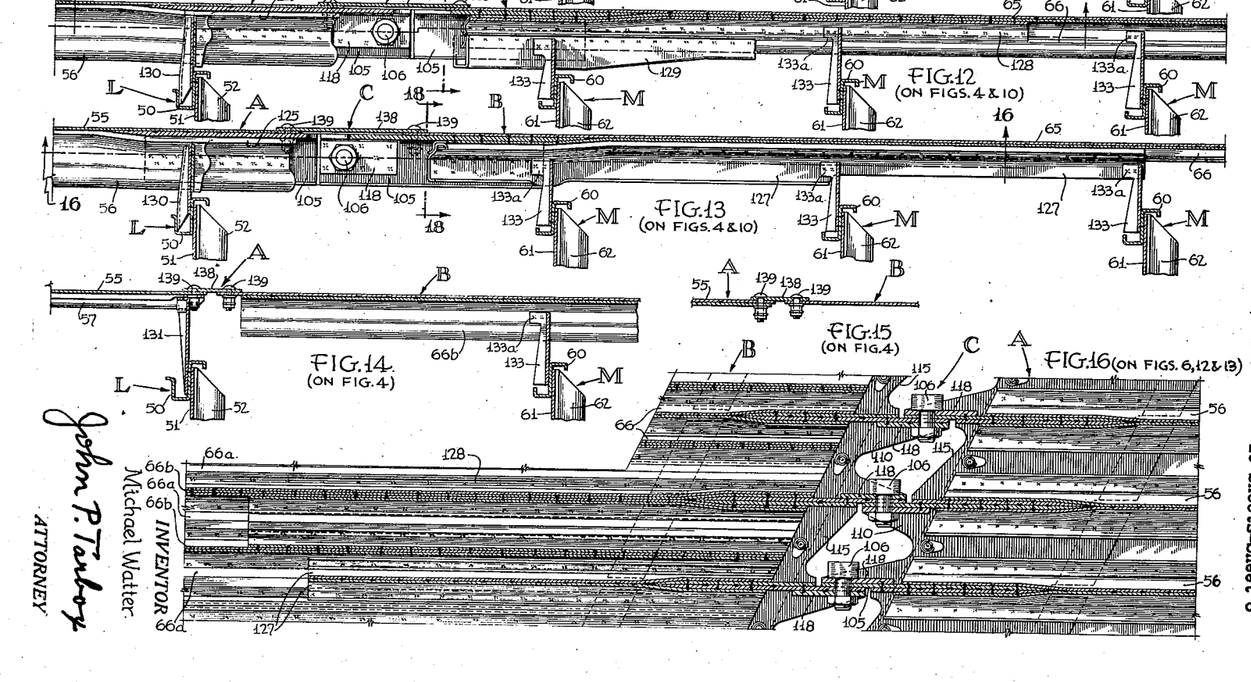
Fig. 6 is a view similar to Fig. 4 but taken below and looking upward toward the upper skin blanket.
Fig. 12 is a partial enlarged vertical spanwise section taken on the line 12—12 of Figs. 4 and 10.
Fig. 13 is a partial enlarged vertical spanwise section taken on the line 13—13 of Figs. 4 and 10.
Fig. 14 is a partial enlarged vertical spanwise section taken on the line 14—14 of Fig. 4.
Fig. 15 is a partial enlarged vertical spanwise section taken on the line 15—15 of Fig. 4.
Fig. 16 is a partial enlarged horizontal section of parts shown in the area 16 of Fig. 6, the plane of the view being indicated by the line 16—16 in Figs. 12 and 13.

Referring to Figs. 4, 5 and 6, it can be seen that the truncated V joint comprises two converging lines of step-wise or echelon arranged bolt connections, each joint or connection including a pair of overlapping coupling plates or flanges 105 and connecting bolts 106. As best seen in Fig. 5, the center lines of the bolt holes are spaced apart laterally (i. e. spanwise of the wing) by a considerable distance and stand clear of the end of the next adjacent lower plate 105. This provides clear access for drilling and reaming, permits ready insertion of the bolts when the parts are assembled, and together with the open spaces on each side, provides ample access for holding the bolts and tightening the nuts thereon.

Joint coupling members

Figures 5, 6, 7, 8, 9, 10, 11, 12, 13, 17, 18, 19, 20, 21, 35:
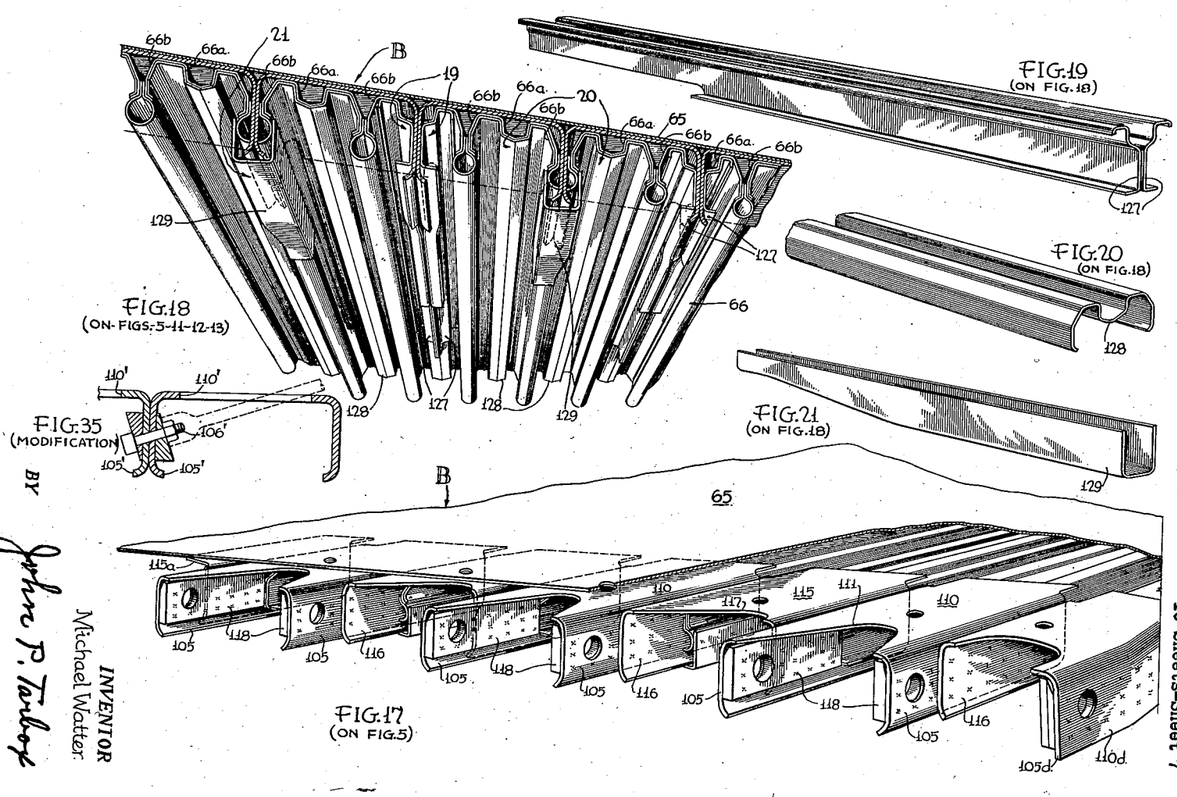
Fig. 17 is an enlarged end and topside perspective view of a portion of the outer wing panel, the view being taken about the line 17—17 of Fig. 5.
Fig. 18 is an enlarged vertical section and underside perspective view of a portion of the outer wing panel, the view being taken about on the line 18—18 of Fig. 5 and the section location being indicated also on Figs. 11, 12 and 13.
Fig. 19 is a side perspective view of the reinforcing means for a Y-bulb blanket stringer element, the view being indicated by the directive lead lines 19 in Fig. 18.
Fig. 20 is a side perspective view of the reinforcing means for the channel blanket stringer elements, the view being indicated by either of the directive lead lines 20 in Fig. 18.
Fig. 21 is a side perspective view of the reinforcing means for an end-slitted Y-bulb blanket stringer element, the view being indicated by the directive lead line 21 in Fig. 18.
Fig. 35 (on Sheet 7 with Figs. 17-21) is a partial vertical chordwise section of a slightly modified connective construction.
Figure 6:
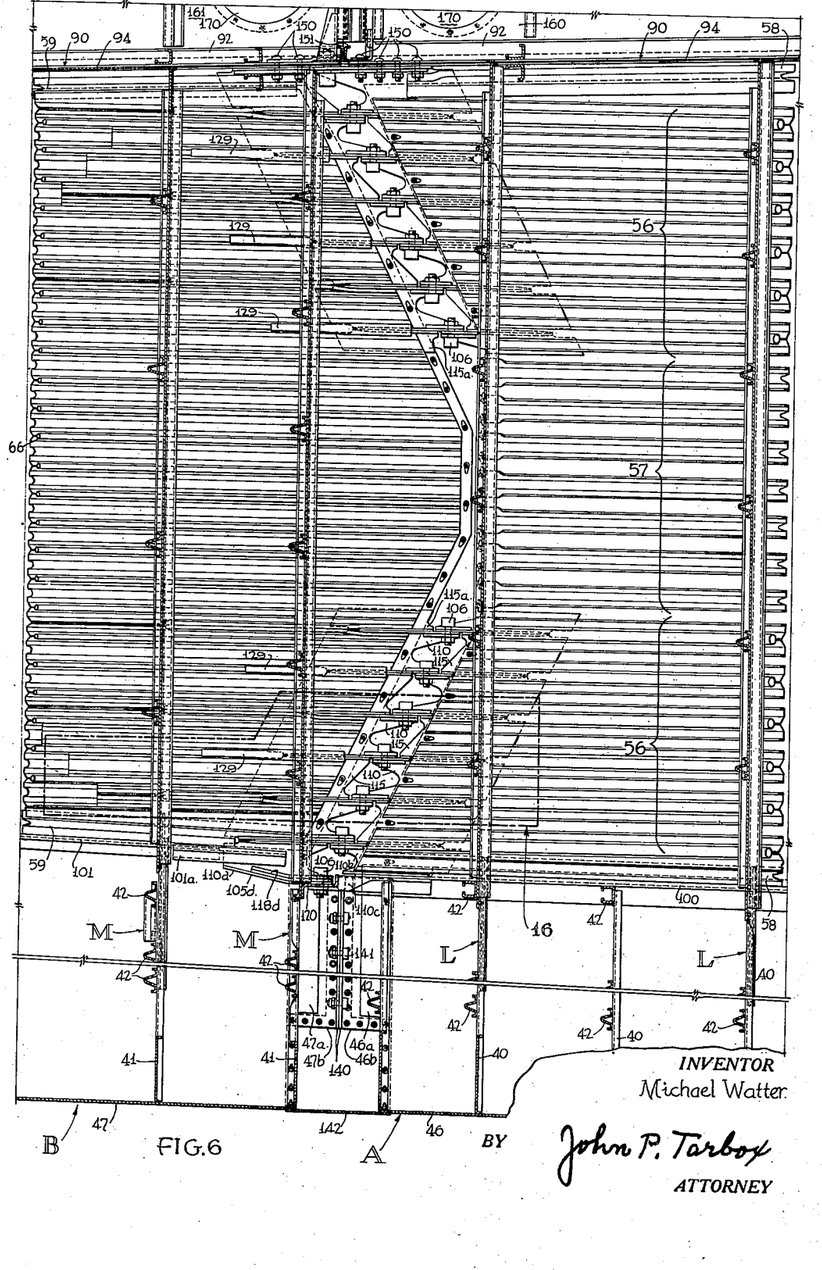

Also, as well shown in Fig. 5, the plates 105 on each side are paired so as to fit in alternate pockets of the opposite side. The parts are almost symmetrical on opposite (front and rear) edges of the center sections. The plates 105 are carried by integrally formed channel-shaped connection or joint coupling members 110. The shape of these members is better shown in Fig. 17 and here it may be seen that each member carries two of the plates 105 as side flanges which are connected by the backing web 111. In cross section, the members 110 are approximately channel or U-shaped but the lower edges of the side flanges 105 are turned inward toward each other. Between each two adjacent channel members 110 there is disposed a similar but shorter channel member 115 and this includes side flanges 116 and a connecting web 117. The flanges 105 and 116 of adjacent coupling members 110, 115 are welded together, as shown in Fig. 17, and within the ends of the projecting flanges 105 there are welded strengthening plates 118. These plates 118 are provided with bolt holes which are aligned with those of the flange plates 105. The webs 110, 117 are cut away from the ends between the side flanges to provide access to the connecting bolts.

Typical members 110 and 115 have been described. Some of the end members in each group depart from the typical. As shown in Fig. 5, on either side of the intervening clear space where there are no connecting members at all, there are provided half members 110a and 115a with flanges 105 and 116 and webs 111a and 117a, respectively, corresponding to similar parts of the typical connection or coupling members.

On the leading edge of the center section of the center panel (Figs. 5 and 6) there is provided a narrow double-flanged member 110b having flanges 105 and 116 and a web 111b. There is also provided a mating half member 110c to be welded to the flange 116 of the member 110b (see also the left side of Fig. 8) through the vertical web of the heavy front stringer member 100 of the center wing panel. On the leading edge of the center section of the outer panel (Figs. 5 and 6) there is provided a double flanged member 110d having a web 117d and short inner flange 116, and having a long bent outer flange 105d adapted to be bolted at its outer end to the protruding end of the companion flange 105c. A double thickness strengthening plate 118d is secured to the flange 105d. A vertically extending Z-shaped strut 120 is secured to the front side and over the outer end of the flange 105d and intervenes between that flange and the companion flange 105c when the parts are assembled. This Z-shaped strut can be clearly seen in elevation in Fig. 26. One of its lateral flanges is welded to the web 51 of rib L and the ends of the flanges are welded to the nose plate 41, Fig. 10.

There is not much departure from the typical construction at the trailing edge so this will be taken up later.

Skin blanket stringers

It will be helpful to observe the character of the skin blanket stiffening stringers because certain of them are involved in the rooting or anchorage of the connection or joint coupling members 110 and 115.

Figures 22, 25, 26, 27, 28:
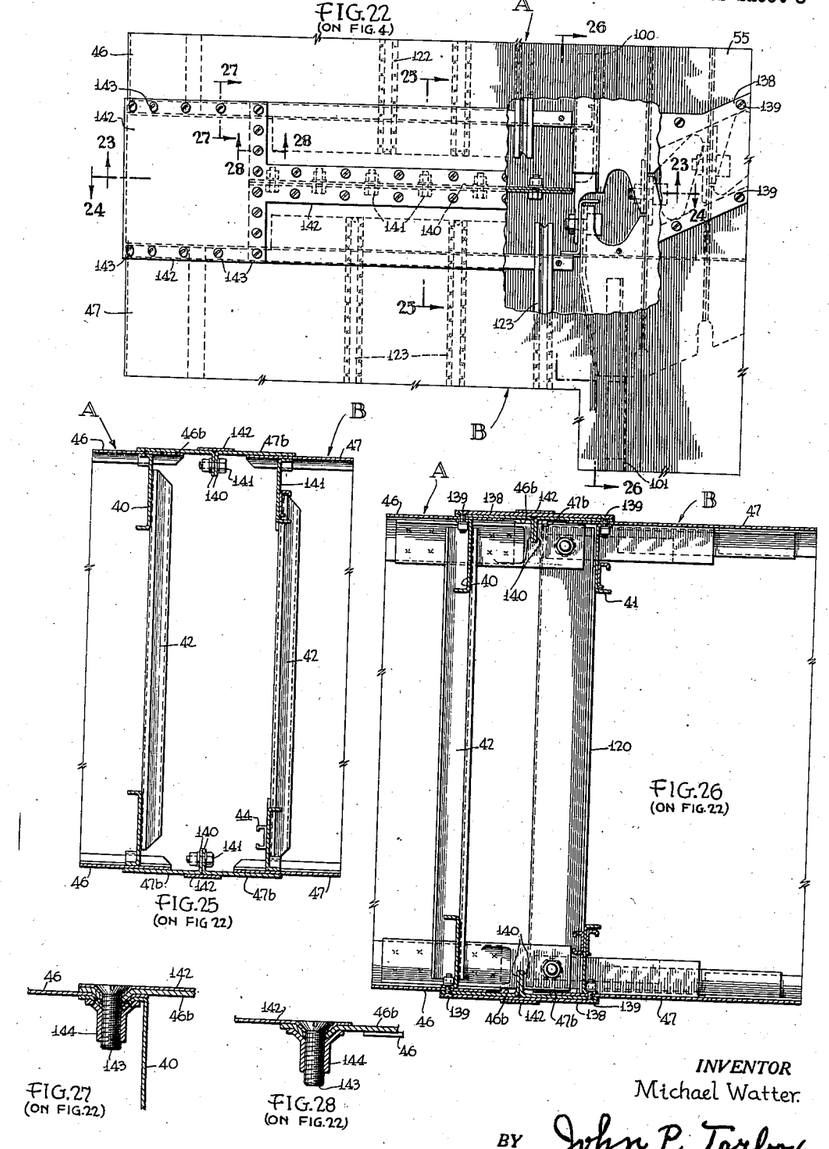
Fig. 22 is a partial enlarged plan view of the leading or nose section of the wing, the view being taken about in the area 22 of Fig. 4.
Fig. 25 is a vertical spanwise section taken on the line 25—25 of Fig. 22.
Fig. 26 is a vertical spanwise section taken on the line 26—26 of Fig. 22.
Fig. 27 is a vertical spanwise section of a small detail, the view being taken on the line 27—27 of Fig. 22.
Fig. 28 is a vertical chordwise section of a small detail, the view being taken on the line 28—28 of Fig. 22.
Figures 22, 23:
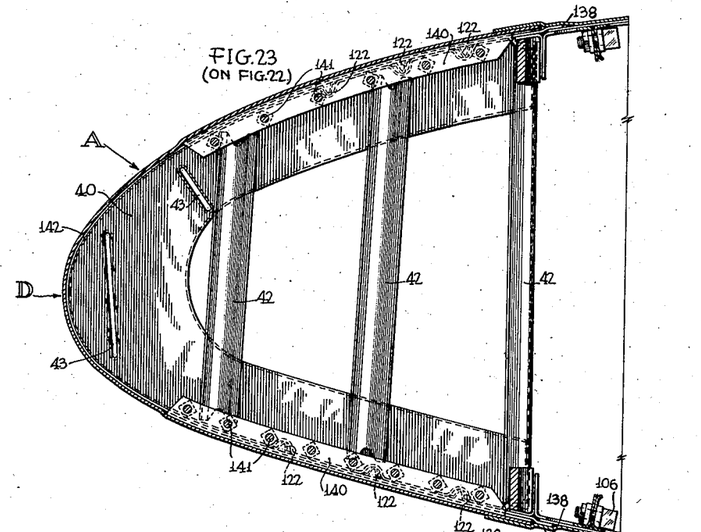
Fig. 23 is a vertical chordwise section taken on the line 23—23 of Fig. 22.
Figures 22, 24:
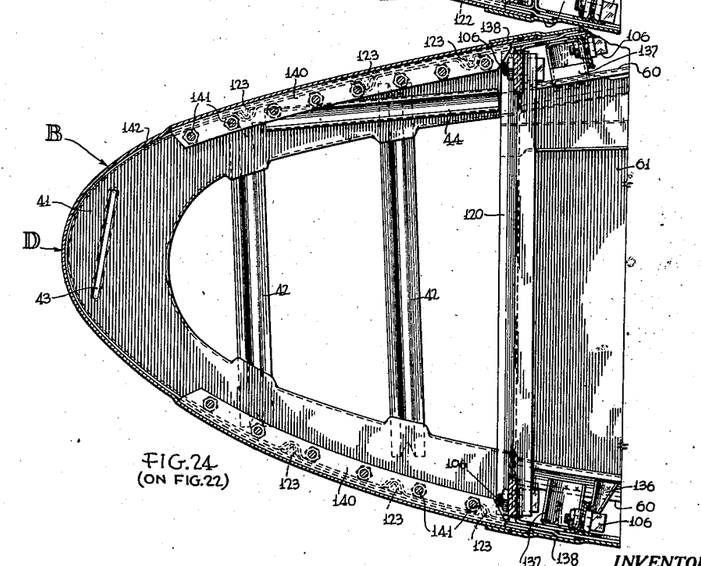
Fig. 24 is a vertical chordwise section taken on the line 24—24 of Fig. 22, the section being the same as for Fig. 23 but the view being taken in the opposite direction and inverted.

As shown in Figs. 22, 23 and 24, the inner and outer nose skin sheets 46 and 47 are provided with several upper and lower spanwise extending channel-shaped stiffening stringers 122 and 123 respectively.

The stiffening channel stringers 57 for the central portion of the center section of the center wing panel (see right side of Fig. 6), which have heretofore been referred to, are hat-shaped in cross section and are welded to the skin sheets 55 through their flanges. In Fig. 6 the ends of the stringers are cut off on a miter to indicate their cross-sectional shape. These center stringers are not utilized in coupling the wing panels together so do not require further consideration. However, it is to be understood that the invention is not limited to constructions embodying such stringers but that all of the stringers may be of the type now to be described.

The stiffening channel stringers 56 of the front and rear portions of the center section of the center wing panel (Fig. 6) are uniformly of Y-bulb shape except the extreme front and rear ones 58 which are hat-shaped in section as heretofore described. The front one is clearly shown at the left side of Figs. 7 and 8.

As previously noted and as shown at the left of Fig. 6, the stringer members of the outer wing panel are all alike except those 59 at the extreme front and rear edges, as heretofore described, and consist of alternating hat-shaped channel elements 66a and Y-bulb elements 66b. The bulb is in this case welded through inwardly extending edges to the outwardly extending edges of the adjacent channel stringers; but they are in effect Y-bulb stringers. Taking the distance between bulb stringers for comparison, the spacing of bulb stringers 56 of the center wing panel is half again as great as that of the bulb stringers 66b of the outer wing panel, that is, there is a 3 to 2 relationship in bulb stringer spacing. Consequently, as shown in Fig. 8, while the channel-shaped connection or coupling members 110 and 115 match unit-for-unit with the stringers 56 of the inner wing panel, the companion coupling members 110 and 115 (Fig. 10) are one and one-half times as wide as the spacing between bulbs 66b of the outer wing panel.

Root connection of joint coupling members

The stringers are opened up back from their ends to receive the side flanges 105, 116 of the coupling members 110, 115. On the center wing panel (Fig. 8) it is only necessary to separate the vertical webs 56a of the stringers 56 and insert the flanges 105, 116 of the coupling members, the stringers being deep enough to take the full width of the flanges without cutting through the bulbs 56b. On the outer wing panel (Fig. 10) it is necessary to slit the stringers because the flanges 105, 116 of the coupling members are deeper than the stringers. The spacing of these stringers is such that it is necessary to slit Y-bulb stringers 66b and channel stringers 66a in alternation, every third stringer of each type being slit.

As shown in Fig. 16, the flanges 105, 116 of the coupling members 110, 115 are tapered on their ends to feather out between the spread sides of the stringers. As shown in Figs. 11, 12 and 13, the webs 111, 117 of the coupling members 110, 115 are also tapered at their ends to feather out toward the skin sheets. The non-typical end coupling members 110a, 110b, 110c, 110d and 115a are similarly tapered on their side flanges and webs. This assists in knifing the coupling assemblies into the stringers by endwise movement.

As shown in Fig. 8, the Y-bulb members of the center wing panel, being deep as explained, are merely spread apart at their ends to receive the side flanges 105, 116 of the coupling members. As shown at the left side of Figs. 12 and 13, the upper flanges 125 of the Y-bulb stringers 56 are offset downward on the taper to receive the tapered ends of the webs 111, 117. Where necessary, as shown at the left of Fig. 8, the flanges 125 of the stringers 56 may be cut back and replaced by splice members 125a of different size or shape.

The root construction for the coupling members 110, 115 on the outer wing panel assumes two different specific forms, one for the channel stringers 66a (Figs. 10, 13, 18 and 19), and one for the Y-bulb stringers 66b (Figs. 10, 11, 12, 18, 20 and 21).

Referring to Figs. 10, 13, 18 and 19, the channel stringers 66a are slit down the middle from one end to receive the flanges 105 and 116 and are reinforced on each side by closely fitting flange strengthening members 127. A pair of these strengthening members 127 is shown in Fig. 19. As shown at the bottom left of Fig. 16, the members 127 are considerably longer than the root connections; and, as shown in Figs. 13 and 19, the outer flanges which are welded to the blanket skin sheets are longer than the inner portions.

Referring to Figs. 10, 11, 12, 18, 20 and 21, the Y-bulb stringers 66b are slit down the middle from one end to receive the flanges 105 and 116 and are reinforced on each side by closely fitting flanged strengthening members 128. One of these strengthening members is shown in Fig. 20, the other being similar for the other side of the Y-bulb stringer. The members 128 are wide enough and suitably shaped to cover the next adjacent channel stringer 66a and fit against the side of the next adjacent Y-bulb stringer 66b. In the left middle portion of Fig. 16 the extent of one of the strengthening members 128 can be observed.

As shown in Figs. 10, 12, 18 and 21, where a bulb of Y-bulb stringer 66b is slit there is provided, in addition to the side reinforcing members 128, a bottom reinforcing channel-shaped clip 129. At the outer end the clip 129 is deep enough to embrace the lower edges of the flanges 105, 116 of the coupling members 110, 115, and beyond the root ends of these flanges the clips 129 are tapered outward to fit the bulb portion of the stringer.

All root connections and reinforcements where the coupling members 110, 115 are grafted to the ends of the center and outer wing panels are suitably made, as by welding as indicated, before the panels are connected together. The parts are held in jigs during welding.

Blanket attaching clips

As shown in Figs. 7, 11, 12, and 13, the skin blankets are connected through their stringers 56 to the Z-shaped chords 50 of the ribs L of the center wing panel by interfitting clips 130. The clips here shown have duplex heads 130a, 130b (Fig. 7) which are welded together through their main webs and welded to the sides of adjacent stringers 56 through their side flanges. The part 130a (Figs. 11-13) carries the bottom portion 130c which is welded to the web and upturned flange of the rib chord 50.

In the center of the center panel (Figs. 4 and 14) the lighter and simpler clips 131 are used. Their shape and mode of connection is obvious from these views.

As shown in Figs. 9, 11, 12, 13 and 14, the typical clips 133 for the outer panel are provided only for the Y-bulb stringers 66b and are suitably shaped to fit the side thereof. They are welded through lateral flanges 133a at the top to the webs above the bulb and at the bottoms are welded to the webs of the Z-shaped rib chords 60 of the ribs M. Where the clips are secured over the stringer reinforcement elements they are suitably shaped to fit.

In Fig. 10 there are shown several clips which depart slightly from the typical to adapt them to the parts with which they fit. A pair of similar clips 135 are secured to the reinforcing members 127 for the slit channel stringers. Another similar clip 136 is provided adjacent the deformed end 59a of the heavy edge channel stringer 59. Also, as shown in Fig. 10 and by reference to Fig. 24, a clip 137 is welded to the rib chord 60 through its main flange and to the inside of the channel coupling member 110d through bent flanges at its end, the heavy stringer member 101 and its extension 101a having terminated beyond the location of the clip 137.

Joint closure strips

Referring to Figs. 1, 11 to 15, 22 to 24, and 26, the top and bottom gaps in the skin blankets at the center section joint are closed after the connection has been made by finish or closure strips 138 secured by screws 139. In Fig. 4 the outline shape of these strips and sockets for the screws are indicated. These strips are capable of taking the skin shear in these regions.

Nose Section Joint—Figs. 4 to 6, and 22 to 28

As shown in Figs. 4 to 6, the skin sheets 46, 47 of the nose sections A—D and B—D do not meet when the wing panels are connected. The sheets are notched at the front to stand apart further than at the projections 46a, 47a at the top and bottom. Heavy plates 46b, 47b, respectively, are welded to these projections 46a and 47a and, as shown in Fig. 25, these plates 46b, 47b are formed with mating inturned flanges 140 which are connected by bolts 141. A bent finish strip 142, secured by screws 143, closes the nose access opening after the connection has been made. Figs. 27 and 28 show how the screws are threaded into flanged screw bushings 144 which are welded in position.

Trailing Section Joint—Figs. 1, 4 to 6, and 30 to 34

Figures 1, 29, 31, 32, 33, 34:
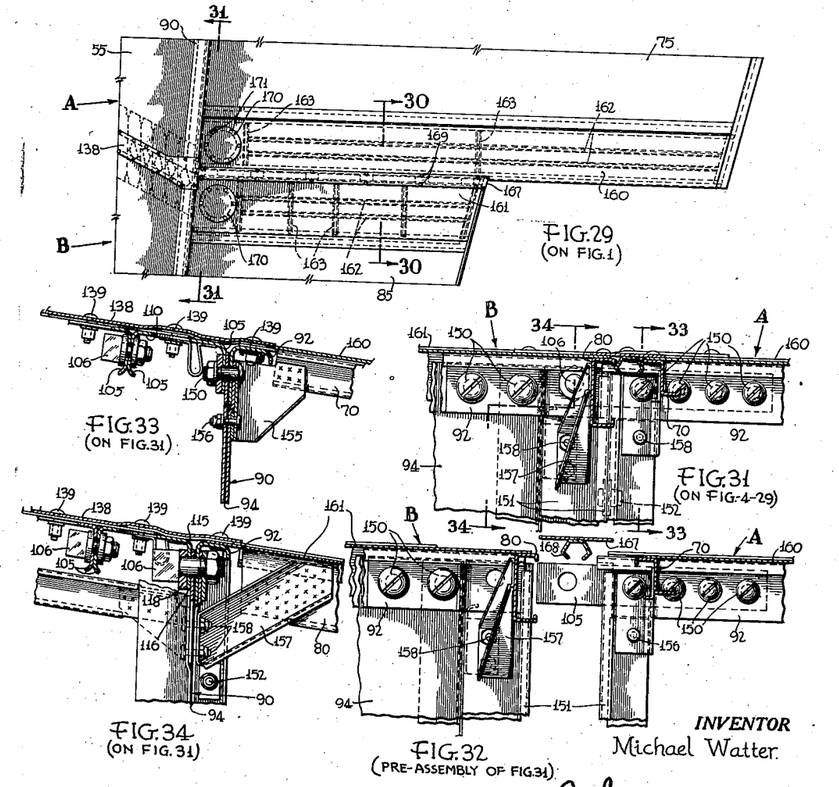
Fig. 29 is a partial enlarged plan view of the trailing wing section, the view being taken about in the area 29 of Fig. 1.
Fig. 31 is a partial enlarged vertical spanwise section taken on the broken line 31—31 of Figs. 4 and 29.
Fig. 32 is a pre-assembly view of the parts shown in Fig. 31.
Fig. 33 is a vertical chordwise section taken on the line 33—33 of Fig. 31.
Fig. 34 is a vertical chordwise section taken on the line 34—34 of Fig. 31.

As shown in Figs. 6 and 33, the rear coupling members 110 and 115 are secured through their side flange plates 105 and 116 to the main spar 90 by bolts 150. Vertical L-shaped angle coupling members 151 are welded to the rear side of each part of the spar 90 and at least one of the bolts 150 passes through each end of one of these angle members 151. As shown in Fig. 31, the separate portions of the spar 90 are connected at the joint by bolts 152 which pass through the rearwardly extending flanges of the angle members 151. As shown in Fig. 34, one of the coupling bolts 106 which passes through a coupling flange plate 105 also passes through the elements of the spar at each edge to make the spar stronger at the joint.

As shown in Fig. 33, the rear section chords 70 are provided with gussets 155 which are each secured to the spar 90 by one of the bolts 150, just noted, and by an additional bolt 156. Turning to Fig. 34, the chords 80 of the rear section are provided with gussets 157 which are each secured to the spar 90 by bolts 158.

Figures 29, 30:
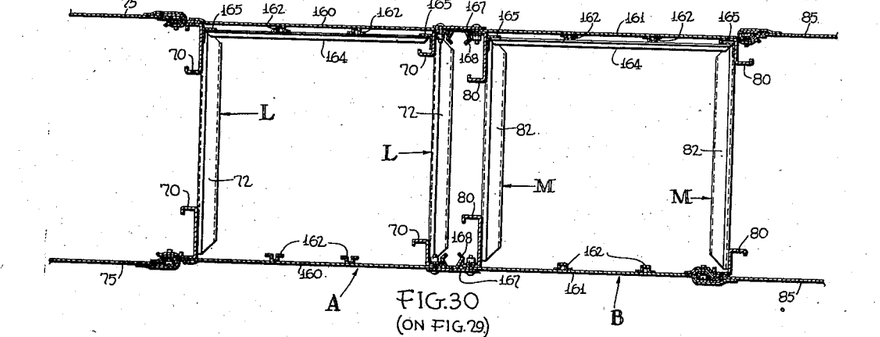
Fig. 30 is an enlarged vertical spanwise section taken on the line 30—30 of Fig. 29.

Referring to Figs. 29 and 30, the space on each side of the joint in the trailing section is covered by plates 160 and 161, on the center and outer panel sides respectively, and these plates are strengthened by chordwise stringers 162, and by spanwise sub-stringers 164. The sub-stringers 164 are secured at their ends to angle brackets 165 fast on the rib chords 70 or 80.

There is practically no strain to be taken across the joint in the trailing section, hence there is no need for heavily connecting the parts across the joint here. The space between the plates 160 and 161 is covered by rear finish strips 167 and these strips may be retained by snap clips 168 or by screws 169, or both, as desired. Access openings in the front ends of the plates 160, 161 are closed by caps 170 which are secured by screws 171.

Modified Coupling—Fig. 18

In Fig. 18 (Sheet 7 of the drawings) there is shown a slightly modified coupling construction in which the holes in the shear webs 105' of the U-shaped coupling members 110' are provided with chordwise extending holes for the shear bolts 106' which have an inclination or pitch relative to the central plane of the wing. The reinforcing plates 118' may be appropriately tapered to squarely seat the head and nut of the bolt, or suitably shaped washers may be provided. In a sense this is not a modification inasmuch as it may be added directly to the main construction. The arrangement permits an end socket wrench to be used on the nuts, which is quite an advantage in line production where motor driven spindle wrenches are used.

Summary

It is thus seen that the invention provides an improved joint which utilizes shear members adjacent each surface to be joined and that the joint is so shaped and its elements so arranged as to provide maximum strength and accessibility with minimum weight and possibility of failure. The invention has been described in connection with a wing and a wing of certain characteristics but it has more general application.

While one embodiment of the invention has been described for purposes of illustration it will be understood that the invention may have other embodiments within the limits of the prior art and the scope of the subjoined claims.

What is claimed is:

1. In a jointed cantilever panel construction which includes a pair of endwise adjacent panels of the stressed skin type, each panel including laterally spaced skin blankets secured on opposite sides of a frame, the combination therewith of means providing a connection between the blanket of one panel and the end-adjacent blanket of the other panel on each side of the frame, said connecting means comprising for each of the blankets a rigid load distribution and transfer structure including a plurality of parallel channel members secured to the blanket with their axes directed toward the end thereof, the side flanges of the channel members of each blanket engaging and being rigidly secured to the side flanges of adjacent channel members, and alternate channel members of each blanket projecting axially beyond the intermediate channel members to provide recesses therebetween, the projecting channel members of each blanket extending into the recesses formed between the projecting channel members of the end-adjacent blanket and having their side flanges engaging the side flanges of the channel members of the end-adjacent blanket, and shear bolts extending through the inter-engaging side flanges of the projecting channel members of end-adjacent blankets.

2. In a jointed cantilever panel construction which includes a pair of endwise adjacent panels of the stressed skin type, each panel including laterally spaced skin blankets secured on opposite sides of a frame, the combination therewith of means providing a connection between the blanket of one panel and the end-adjacent blanket of the other panel on each side of the frame, said connecting means comprising for each of the blankets a rigid load distribution and transfer structure including a plurality of parallel channel members secured to the blanket with their axes directed toward the end thereof, the side flanges of the channel members of each blanket engaging and being rigidly secured to the side flanges of adjacent channel members, and alternate channel members of each blanket projecting axially beyond the intermediate channel members to provide recesses therebetween, the projecting channel members of each blanket extending into the recess formed between the projecting channel members of the end-adjacent blanket and having their side flanges engaging the side flanges of the channel members of the end-adjacent blanket, and shear bolts extending through the inter-engaging side flanges of the projecting channel members of end-adjacent blankets, the channel members projecting beyond the skin blanket at each joint zone and having the webs between the side flanges of the channel members cut away to permit access to said shear bolts from the outside of the panels.

3. A joint construction for a pair of adjacent structures, one of which is a cantilever panel having laterally spaced skin blankets secured to opposite sides of a frame, each blanket embodying a sheet metal skin and a plurality of longitudinally extending stringers thereon with their axes directed toward the joint end of the blanket, a transversely rigid joint structure for each blanket extending transversely of and rigidly secured to the ends of the stringers and to the end of the skin, each said joint structure comprising a plurality of spaced stringer-wise extending flange portions projecting laterally from one side of the skin toward the opposite skin for side-overlapping engagement with corresponding flange portions of the other of said adjacent members, each pair of overlapping flange portions having a bolt opening extending therethrough transversely of the axes of the stringers and approximately parallel to the skin sheet, and a shear bolt passing through the holes of each pair of overlapping flange portions.

4. A joint construction for connecting end-adjacent panels together, each panel embodying a sheet metal skin and a plurality of longitudinally extending stringers secured thereto with their axes directed toward the joint end of the panel, comprising for each panel a plurality of laterally spaced stringer-wise extending plate-like elements disposed approximately perpendicular to the panel skin, having their inner ends rooted to the ends of said stringers, and having their outer ends projecting to overlap and be connected by shear elements to similar plate-like elements of an adjacent panel, the perpendicular plate-like elements of each panel being provided with angularly extending plate-like elements parallel with and secured to the panel skin.

5. A joint construction for connecting end-adjacent panels together, each panel embodying a sheet metal skin and a plurality of longitudinally extending stringers secured thereto with their axes directed toward the joint end of the panel, comprising for each panel a plurality of laterally spaced stringer-wise extending plate-like elements disposed approximately perpendicular to the panel skin, having their inner ends rooted to the ends of said stringers, and having their outer ends projecting to overlap and be connected by shear elements to similar plate-like elements of an adjacent panel, said plate-like elements being provided with lateral web elements which are also rooted at their inner ends to said stringers, said webs having parts of their outer ends cut away to provide access therethrough to the outer ends of said plate-like elements.

6. A joint construction for connecting longitudinally aligned inner and outer end-adjacent panels together, comprising in combination, a plurality of laterally spaced longitudinally extending plate-like elements anchored to the adjacent ends of the panels and disposed approximately perpendicular to the plane of said panels, the plate like elements of opposite panels overlapping on the sides at their ends in pairs and being provided with aligned transverse holes the axes of which are approximately parallel to the plane of the panels, and shear bolts passing through said holes, the plate-like elements of each panel being secured to backing web means which is effectively continuous as a rigid element along the end of the panels to connect a plurality of plate-like elements, and said backing web means forming a panel-reinforcing shear taking element of the connected panel structure.

7. A joint construction for connecting longitudinally aligned end-adjacent inner and outer panels together, comprising in combination, longitudinally extending plate-like elements anchored to the ends of adjacent panels and disposed approximately perpendicular to the plane of the panels, the plate-like elements of opposite panels overlapping on the sides at their ends in pairs and being provided with mating transverse holes the axes of which are approximately parallel to the plane of the panels, and shear bolts passing through said holes, the plate-like elements of each panel being provided with interconnecting backing web means secured to the panels and forming a lateral beam-like shear taking element of the connected panel structure, said backing web means being cut back at the ends between adjacent webs to provide openings for access to the shear bolts therebeneath.

8. A panel joint construction, comprising in combination an inner panel, an end-adjacent outer panel aligned therewith, a skin blanket on each side of each panel, said skin blankets each including a skin sheet and longitudinal stringers therefor with their axes extending toward the end of the panel, each stringer including a base portion secured to the skin sheet and an outstanding portion extending away from and approximately normal to the skin sheet, and coupling means for connecting the end-adjacent skin blankets at the same sides of said panels together, said coupling means including a plurality of mating pairs of plate-like elements which are approximately normal to the skin sheet and which are connected by transversely extending shear means which are approximately parallel to the skin sheet, said plate-like elements being provided with backing webs parallel to the skin sheets, and said plate-like elements being anchored to said stringers in their outstanding portions.

9. A joint construction through which a panel may be anchored to an adjacent part, comprising in combination, a panel skin blanket including a skin sheet and stringers having their axes directed toward the end of the blanket, each stringer including a base portion secured to the skin sheet and an open rib-like portion extending away from the skin sheet, and coupling means for connecting the skin blanket to an adjacent part, said coupling means including a stringer-wise extending U-shaped member having its side flanges and back anchored to said stringers, the side flanges being located in the rib-like portions of the stringers, and certain of said side flanges having transverse holes in their outer ends adapted to take a transverse shear bolt to anchor the panel to the adjacent part.

10. A joint construction through which a panel may be anchored to an adjacent part, comprising in combination, a panel skin blanket including a skin sheet and stringers having their axes directed toward the end of the blanket, each stringer including a base portion secured to the skin sheet and an open rib-like portion extending away from the skin sheet, and coupling means for connecting the skin blanket to an adjacent part, said coupling means including a stringer-wise extending U-shaped member having its side flanges and back anchored to said stringers, the side flanges being located in the rib-like portions of the stringers, and certain of said side flanges having transverse holes in their outer ends adapted to take a transverse shear bolt to anchor the panel to the adjacent part, the stringer rib-like portions being slitted at the ends to receive the side flanges of the U-shaped members, and shape-fitting reinforcing members secured on each side of the ends of the rib-like portion of the stringers.

11. A joint construction through which a panel may be anchored to an adjacent part, comprising in combination, a panel skin blanket including a skin sheet and stringers having their axes directed toward the end of the blanket, each stringer including a base portion secured to the skin sheet and an open rib-like portion extending away from the skin sheet, and coupling means for connecting the skin blanket to an adjacent part, said coupling means including a stringerwise extending U-shaped member having its side flanges and back anchored to said stringers, the side flanges being located in the rib-like portions of the stringers, and certain of said side flanges having transverse holes in their outer ends adapted to take a transverse shear bolt to anchor the panel to the adjacent part, the stringer-rib-like portions being slitted at the ends to receive the side flanges of the U-shaped members, shape-fitting reinforcing members secured on each side of the ends of the rib-like portions of the stringers, and channel-shaped reinforcing members secured over the ends of the stringers where slitted.

12. A joint construction for connecting longitudinally aligned end-adjacent panels together, comprising in combination, a plurality of laterally spaced longitudinally extending plate-like elements anchored to the adjacent ends of the panels and disposed approximately perpendicular to the plane of the panels, the elements of opposite panels overlapping on the sides at their ends in pairs and being provided with aligned transverse holes, and shear bolts passing through the holes of each pair, said joint including a plurality of such shear connections arranged along converging joint lines in the plane of and within a relatively short portion of the length of the panels.

13. An airfoil joint construction, comprising in combination, an inner panel and an outer panel each including spaced skin sheets and each skin sheet being provided with a connecting joint formed by overlapping members anchored to the adjacent ends of the panels and disposed approximately perpendicular to the plane of the panels, the members of opposite end-adjacent panels overlapping on the sides at their ends in pairs and being provided with aligned transverse holes, and shear bolts passing through holes of each pair, said joint including a plurality of such shear connections arranged along converging lines in the plane of and within a relatively short portion of the length of the panels.

14. An airfoil joint construction, comprising in combination, an inner panel and an outer panel provided with a connecting joint therebetween formed by side-overlapping plate members connected by shear elements, said joint including a plurality of shear elements arranged along converging lines in the plane of and within a relatively short portion of the length of the panels.

15. An airfoil joint construction, comprising in combination, an inner panel and an outer panel provided with a connecting joint therebetween formed by side-overlapping plate members connected by shear elements, said joint including a plurality of shear elements arranged along converging lines in the plane of the panels, said shear elements being arranged along converging lines which form the sides of a truncated V.

16. An airfoil joint construction, comprising in combination, an inner panel and an end-adjacent outer panel each including laterally spaced skin sheets and each pair of end adjacent skin sheets being provided with a transverse connecting joint formed by a plurality of pairs of longitudinally extending side-overlapping plate members connected by transverse shear elements, the adjacent shear elements of a joint being located at different points relative to the length of the longitudinal axis of the panel.

17. An airfoil joint construction comprising in combination, an inner airfoil panel, an outer airfoil panel, and means for coupling said panels, said coupling means including mating pairs of longitudinally extending side-overlapping plates, one of each pair of plates being secured to each panel and said pairs being spaced apart laterally, said plates being provided with holes for connecting shear bolts which are arranged with their axes in trans-plate planes and inclined in the transplate plane relative to a perpendicular line through the plate and relative to the surface of the airfoil sufficiently to permit access to the bolt holes in the lines of their axes beyond the side edges of adjacent coupling plates after the panels are brought together.

18. An airfoil panel adapted to be connected in longitudinal end-adjacent relation to an adjacent structure, said panel including a skin sheet provided with a plurality of laterally spaced longitudinally disposed joint plates which stand approximately perpendicular to the skin sheet, said plates each being provided with a transverse shear bolt hole, and the bolt holes of adjacent plates being disposed in echelon to permit access on one side of the plate in the line of a hole beyond the end of the adjacent plate on that side.

19. An airfoil joint construction, comprising in combination, an inner panel and an end adjacent outer panel each including a nose section, a center section, and a trailing section, joint means for connecting said center sections along converging lines in the plane of and within a relatively short portion of the length of the panel, and means for connecting the nose and trailing sections along transverse lines which run outward from the more distant ends of the converging joint lines of the center panel sections.

20. A panel joint as for an aircraft airfoil panel, comprising in combination, a panel including a skin sheet and stringers secured to the skin sheet with their axes directed toward the end of the sheet which is connected to an adjacent structure, said stringers including base portions secured to the skin sheet and adjacent parallel side wall portions which extend away from the skin sheet in an approximately perpendicular direction, plate-like joint elements disposed between the adjacent parallel side wall portions of the stringers and secured thereto by shear means, the plate-like elements thus also being approximately perpendicular to the skin sheet, mating parallel plate-like elements on the adjacent structure, and shear means connecting together the plate-like elements of the panel and the adjacent structure in side-overlapping disposition.

21. A panel joint as for an aircraft airfoil panel, comprising in combination, a panel including a skin sheet and stringers secured to the skin sheet with their axes directed toward the end of the sheet which is connected to an adjacent structure, said stringers including base portions secured to the skin sheet and adjacent parallel side wall portions which extend away from the skin sheet in an approximately perpendicular direction, plate-like joint elements disposed between the adjacent parallel side wall portions of the stringers and secured thereto by shear means, the plate-like elements thus also being approximately perpendicular to the skin sheet, mating parallel plate-like elements on the adjacent structure, and shear means connecting together the plate-like elements of the panel and the adjacent structure in side-overlapping disposition, said plate-like joint elements of the panel also including lateral webs which are secured with the base portion of a stringer in shear to the skin sheet.

22. A panel joint as for an aircraft airfoil panel, comprising in combination a panel including a skin sheet and stringers secured to the skin sheet with their axes directed toward the end of the sheet which is connected to an adjacent structure, said stringers including base portions secured to the skin sheet and adjacent parallel side wall portions which extend away from the skin sheet in an approximately perpendicular direction, plate-like joint elements disposed between the adjacent parallel side wall portions of the stringers and secured thereto by shear means, the plate-like elements thus also being approximately perpendicular to the skin sheet, mating parallel plate-like elements on the adjacent structure, and shear means connecting together the plate-like elements of the panel and the adjacent structure in side-overlapping disposition, said plate-like joint elements being provided adjacent each side of the panel but being omitted at the center of the panel.

23. A panel joint, as for an aircraft airfoil panel, comprising in combination, a panel including a skin sheet with stiff stringers secured thereto on one face in a zone at each edge thereof, and joint means for connecting the panel to an adjacent structure, said joint means including a transverse beam-like structure secured across the end of the panel in each edge zone, and a plurality of shear coupling plates secured to each beam-like structure, said plates being approximately perpendicular to the skin sheet and secured to the stringers and skin sheet, and the central zone of the panel at the joint being left free of said shear coupling plates.

MICHAEL WATTER.